(12) United States Patent
Tanaka et al.

(10) Patent No.: US 9,784,367 B2
(45) Date of Patent: Oct. 10, 2017

(54) CONTROL APPARATUS FOR VEHICLE DRIVING SYSTEM

(71) Applicant: TOYOTA JIDOSHA KABUSHIKI KAISHA, Toyota-shi, Aichi-ken (JP)

(72) Inventors: Takaaki Tanaka, Toyota (JP); Nobufusa Kobayashi, Anjo (JP); Masato Yoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/380,510

(22) Filed: Dec. 15, 2016

(65) Prior Publication Data

US 2017/0184196 A1    Jun. 29, 2017

(30) Foreign Application Priority Data

Dec. 24, 2015  (JP) ................................. 2015-252565

(51) Int. Cl.
*F16H 3/72* (2006.01)
*F16H 61/30* (2006.01)
(Continued)

(52) U.S. Cl.
CPC ............. *F16H 61/30* (2013.01); *B60K 6/365* (2013.01); *B60K 6/445* (2013.01); *B60W 10/11* (2013.01); *B60W 20/00* (2013.01); *F16H 3/728* (2013.01); *F16H 37/084* (2013.01); *F16H 61/00* (2013.01); *B60W 2510/1025* (2013.01); *B60W 2710/02* (2013.01); *B60Y 2200/92* (2013.01); *B60Y 2300/427* (2013.01); *F16H 2003/445* (2013.01); *F16H 2059/147* (2013.01);
(Continued)

(58) Field of Classification Search
CPC ......... F16H 3/728; F16H 61/30; B60K 6/365; B60K 6/445
See application file for complete search history.

(56) References Cited

U.S. PATENT DOCUMENTS

2005/0272555 A1    12/2005  Tabata et al.
2008/0039286 A1*    2/2008  Asami ................... B60W 10/06
                                                          477/156
(Continued)

FOREIGN PATENT DOCUMENTS

JP    H11-230330 A    8/1999
JP    2005-344850 A    12/2005

*Primary Examiner* — Edwin A Young
(74) *Attorney, Agent, or Firm* — Oliff PLC (57) ABSTRACT

While a vehicle is traveling in a state where any one of gear positions of a mechanical stepped transmission unit is established, until an estimated input torque that is obtained from the equation of motion for an electrical differential unit changes, a hydraulic pressure of a non-engaged intended hydraulic friction engagement device is increased, and a pack end pressure is learned on the basis of the hydraulic pressure at that time. Therefore, irrespective of feedback control, or the like, over motor generators of the electrical differential unit, it is possible to appropriately learn the pack end pressure, so it is possible to appropriately execute hydraulic control over the hydraulic friction engagement devices, that is, engaging and releasing control, or the like, at the time of shifting, irrespective of individual differences of the portions, aging of friction materials, or the like.

3 Claims, 7 Drawing Sheets

(51) Int. Cl.
    *B60K 6/365*     (2007.10)
    *B60K 6/445*     (2007.10)
    *B60W 10/11*     (2012.01)
    *B60W 20/00*     (2016.01)
    *F16H 37/08*     (2006.01)
    *F16H 3/44*     (2006.01)
    *F16H 61/00*     (2006.01)
    *F16H 61/06*     (2006.01)
    *F16H 59/14*     (2006.01)

(52) U.S. Cl.
    CPC ............... *F16H 2061/009* (2013.01); *F16H 2061/0087* (2013.01); *F16H 2061/064* (2013.01); *F16H 2200/2007* (2013.01); *F16H 2200/2041* (2013.01); *F16H 2200/2066* (2013.01); *F16H 2200/2082* (2013.01); *F16H 2342/042* (2013.01); *Y10S 903/945* (2013.01)

(56) References Cited

U.S. PATENT DOCUMENTS

| | | | |
|---|---|---|---|
| 2008/0207375 A1* | 8/2008 | Shimizu | B60K 6/445 475/127 |
| 2010/0087287 A1* | 4/2010 | Tabata | B60W 20/30 477/3 |

\* cited by examiner

|  |  | CLUTCH | | BRAKE | | ENGAGEMENT DEVICE (NON-ENGAGED) OF WHICH PACK END PRESSURE IS ALLOWED TO BE LEARNED |
|---|---|---|---|---|---|---|
|  |  | C1 | C2 | B1 | B2 |  |
| D | 1st | ○ |  |  | (○) | C2, B1 |
|  | 2nd | ○ |  | ○ |  | C2, B2 |
|  | 3rd | ○ | ○ |  |  | B1, B2 |
|  | 4th |  | ○ | ○ |  | C1, B2 |

CONTROL APPARATUS FOR VEHICLE DRIVING SYSTEM

INCORPORATION BY REFERENCE

The disclosure of Japanese Patent Application No. 2015-252565 filed on Dec. 24, 2015 including the specification, drawings and abstract is incorporated herein by reference in its entirety.

BACKGROUND OF THE INVENTION

1. Field of the Invention

The invention relates to a vehicle driving system including an electrical differential unit and a mechanical stepped transmission unit and, more particularly, to hydraulic control over hydraulic friction engagement devices of the mechanical stepped transmission unit.

2. Description of Related Art

There is known a vehicle driving system including a mechanical stepped transmission unit in which a plurality of gear positions having different speed ratios are established in response to engaged/released states of a plurality of hydraulic friction engagement devices (see Japanese Patent Application Publication No. 11-230330 (JP 11-230330 A)). In such a vehicle driving system, the hydraulic characteristics of the hydraulic friction engagement devices at the time when the hydraulic friction engagement devices are engaged or released vary or change due to, for example, individual differences, such as variations or aging of the friction coefficients of friction materials and dimension errors of pressure receiving portions. For this reason, in JP 11-230330 A, by determining whether the ratio between an input rotation speed and an engine rotation speed has changed while the hydraulic pressure of the intended hydraulic friction engagement device is being gradually increased in a neutral state, a hydraulic pressure at which the intended hydraulic friction engagement device begins to have an engagement torque. Thus, a pack end pressure is learned. The pack end pressure is around a hydraulic pressure at which the hydraulic friction engagement device begins to have an engagement torque and is, for example, a hydraulic pressure just before the hydraulic friction engagement device begins to have an engagement torque.

Incidentally, when an electrical differential unit including a planetary gear differential mechanism coupled to at least two rotary machines and an engine is provided between the above-described mechanical stepped transmission unit and the engine (see Japanese Patent Application Publication No. 2005-344850 (JP 2005-344850 A)), it may not be possible to appropriately learn the hydraulic pressure of each of the above-described hydraulic friction engagement devices. For example, in such an electrical differential unit, if the torque of each rotary machine is controlled in a feedback manner such that an engine rotation speed, a rotation speed of an output member (which corresponds to an input rotation speed of the mechanical stepped transmission unit), and the like, become predetermined target values commensurate with a required output power, or the like, it may not be possible to appropriately detect a change in input rotation speed due to an engagement torque of each hydraulic friction engagement device. If it is not possible to appropriately learn hydraulic pressures in this way, there is a possibility that engaging and releasing control over the hydraulic friction engagement devices is impaired and, as a result, shift response deteriorates and shift shock occurs.

SUMMARY OF THE INVENTION

The invention is configured to, when an electrical differential unit and a mechanical stepped transmission unit are provided, appropriately learn a hydraulic pressure of each of hydraulic friction engagement devices of the mechanical stepped transmission unit.

A control apparatus for a vehicle driving system includes: (a) an electrical differential unit including a planetary gear differential mechanism coupled to at least two rotary machines and an engine; (b) a mechanical stepped transmission unit that is arranged between the electrical differential unit and a drive wheel and that establishes a plurality of gear positions having different speed ratios in response to engaged state of a plurality of hydraulic friction engagement devices; (c) an input torque estimation unit that calculates an estimated input torque of the mechanical stepped transmission unit on the basis of an equation of motion for the electrical differential unit; and (d) a hydraulic control unit that, while a vehicle is traveling in a state where any one of the gear positions of the mechanical stepped transmission unit is established, increases a hydraulic pressure of a non-engaged one of the hydraulic friction engagement devices of the mechanical stepped transmission unit until the estimated input torque changes by a predetermined amount or more.

In the control apparatus, a pack end pressure of the non-engaged one of the hydraulic friction engagement devices may be learned on the basis of the hydraulic pressure at the time when the estimated input torque has changed by the predetermined amount or more.

In the control apparatus, (a) the planetary gear differential mechanism may be a single planetary gear train including a first rotating element coupled to the engine, a second rotating element coupled to a first rotary machine and a third rotating element coupled to a transmission member, (b) a second rotary machine may be coupled to the transmission member, and power may be transmitted from the transmission member to the mechanical stepped transmission unit, and (c) the estimated input torque may be calculated in accordance with an arithmetic expression determined by using a torque of the first rotary machine, a rotational rate of change of the first rotary machine, an inertia of the first rotary machine, a torque of the second rotary machine, a rotational rate of change of the second rotary machine, an inertia of the second rotary machine and a gear ratio of the planetary gear train.

With the thus configured control apparatus, while the vehicle is traveling in a state where any one of the gear positions of the mechanical stepped transmission unit is established, until the estimated input torque that is obtained from the equation of motion for the electrical differential unit changes, the hydraulic pressure of the non-engaged one of the hydraulic friction engagement devices is increased, so it is possible to appropriately learn the pack end pressure on the basis of the hydraulic pressure at that time as described above. That is, as the non-engaged one of the hydraulic friction engagement devices begins to have an engagement torque, the engagement torque becomes rotational resistance for the mechanical stepped transmission unit, the balance among the rotating elements of the electrical differential unit changes as a result of a change in rotation speed due to the rotational resistance, so the operation state of each rotary machine changes, and the estimated input torque that is obtained from the equation of motion also changes. Therefore, irrespective of feedback control, or the like, over the rotary machines, it is possible to appropriately detect generation of the engagement torque. In other words, by increasing the hydraulic pressure of the currently not engaged non-engaged hydraulic friction engagement device is increased and detecting a change in a selected parameter, which occurs as a result of the change in hydraulic pressure, it is possible to eliminate the influence of feedback control, or the like. In addition, the hydraulic pressure of the non-engaged hydraulic friction engagement device is used, so a slight change in hydraulic pressure does not influence traveling. When the hydraulic pressure, such as the pack end pressure, is appropriately learned, it is possible to appropriately execute hydraulic control over the hydraulic friction engagement devices, that is, engaging and releasing control, or the like, at the time of shifting, irrespective of individual differences of the portions, aging of friction materials, or the like.

With the control apparatus, when the planetary gear differential mechanism is a single planetary gear train, the estimated input torque is calculated in accordance with the arithmetic expression determined by using the torque of the first rotary machine, the rotational rate of change of the first rotary machine, the inertia of the first rotary machine, the torque of the second rotary machine, the rotational rate of change of the second rotary machine, the inertia of the second rotary machine and the gear ratio of the planetary gear train. Therefore, it is possible to obtain the estimated input torque with high accuracy as compared to when an engine torque, or the like, having a low accuracy is used, and it is possible to, for example, learn the pack end pressure with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A single pinion type or double pinion type single planetary gear train is suitably used as a differential mechanism of an electrical differential unit. This planetary gear train includes three rotating elements, that is, a sun gear, a carrier and a ring gear. In a nomograph in which the rotation speeds of those rotating elements are connected by a single straight line, for example, an engine is coupled to the rotating element that located in the middle and of which the rotation speed is intermediate, and a first rotary machine for differential action and a second rotary machine for propelling a vehicle are respectively coupled to the rotating elements at both ends. Instead, the second rotary machine, that is a transmission member (a member that is coupled to a mechanical stepped transmission unit), may be coupled to the middle rotating element. The three rotating elements may be constantly relatively rotatable. Instead, any two of the rotating elements may be integrally coupled to each other by a clutch and then integrally rotated in response to a driving state. Alternatively, the rotating element to which the first rotary machine for differential action is coupled may be stopped in rotation by a brake. Where necessary, disconnection means, such as clutches, may be provided between those rotating elements and the engine, first rotary machine and second rotary machine. A differential mechanism in which a plurality of planetary gear trains are combined with each other may be employed, and three or more rotary machines may be coupled to the differential mechanism.

Each rotary machine is a rotary electric machine, and is specifically an electric motor, a generator or a motor generator that is able to alternatively use the functions of both. A generator may be employed as the first rotary machine for differential action and an electric motor may be employed as the second rotary machine for propelling a vehicle; however, when various driving states are assumed, it is desirable to use a motor generator as each of the first rotary machine and the second rotary machine.

A planetary gear transmission or a parallel shaft transmission is widely used as a mechanical stepped transmission unit. Shift determination is made automatically in response to a driving state or in accordance with a driver's shift command. A gear position is changed as a result of engaging or releasing hydraulic friction engagement devices by, for example, electrically switching a hydraulic control circuit. The mechanical stepped transmission unit is, for example, able to establish a plurality of forward gear positions. Instead, the mechanical stepped transmission unit may be a forward/reverse switching device that just changes the gear position between a forward gear position and a reverse gear position.

An input torque estimation unit is, for example, configured to calculate an estimated input torque without using a torque or rotational rate of change of an engine as in the case of the control apparatus according to the invention. However, various modes are applicable. For example, it is possible to calculate an estimated input torque by using the torque or rotational rate of change of the engine. A hydraulic control unit may, for example, increase hydraulic pressure from zero. Instead, various modes are applicable. For example, the hydraulic control unit may increase hydraulic pressure to a latest learned value or a value near the latest learned value at a stroke, and then, where necessary, further increase the hydraulic pressure. It is desirable that an actual hydraulic pressure (actual hydraulic pressure value) be detected by a hydraulic pressure sensor and be learned; however, when hydraulic pressure is gradually increased such that an actual hydraulic pressure is substantially equal to a hydraulic pressure command value, it is possible to learn hydraulic pressure by using a hydraulic pressure command value.

Figure 1:
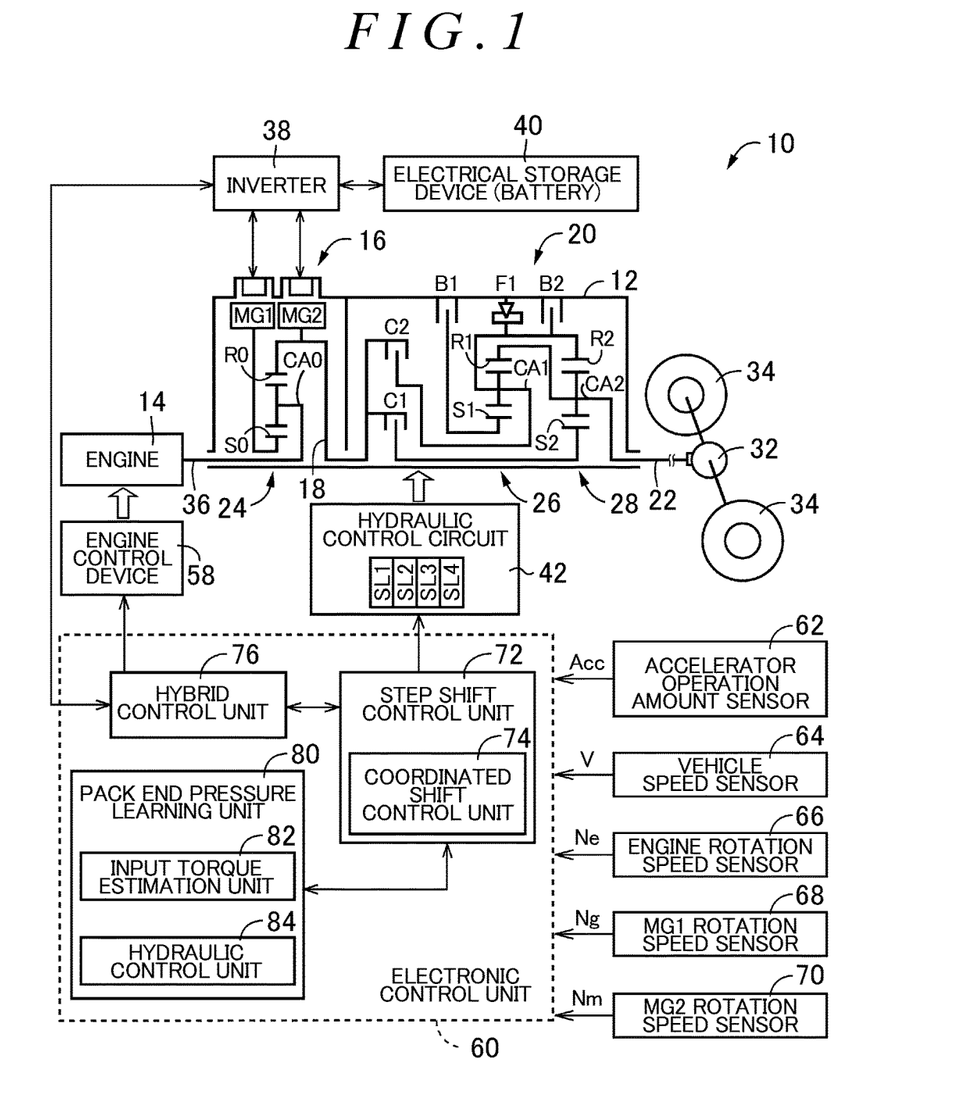
FIG. 1 is a skeletal view including a control system of a vehicle driving system to which the invention is applied.

Hereinafter, an embodiment of the invention will be described in detail with reference to the accompanying drawings. FIG. 1 is a skeletal view including a control system of a vehicle driving system 10 to which the invention is applied. The vehicle driving system 10 includes an engine 14, an electrical differential unit 16, a mechanical stepped transmission unit 20 and an output shaft 22 in series with one another, which are arranged along a common axis. The electrical differential unit 16 and the mechanical stepped transmission unit 20 are accommodated inside a transmission case 12 (hereinafter, referred to as case 12). The case 12 serves as a non-rotating member connected to a vehicle body. The electrical differential unit 16 is directly coupled to the engine 14 or indirectly coupled to the engine 14 via a pulsation absorbing damper (vibration damping device) (not shown), or the like. The mechanical stepped transmission unit 20 is serially coupled via a transmission member 18 to a power transmission path from the electrical differential unit 16 to drive wheels 34. The output shaft 22 is coupled to the mechanical stepped transmission unit 20. Driving force is transmitted from the output shaft 22 to the pair of drive wheels 34 via a differential gear unit (final reduction gear) 32, a pair of axles, and the like. The vehicle driving system 10 is, for example, suitably used for a front-engine rear-drive (FR) vehicle in which the vehicle driving system 10 is longitudinally arranged in the vehicle. The engine 14 is a driving force source for propelling a vehicle, and is an internal combustion engine, such as a gasoline engine and a diesel engine. In the present embodiment, the engine 14 is directly coupled to the electrical differential unit 16 without intervening a fluid transmission device, such as a torque converter and a fluid coupling.

The electrical differential unit 16 includes a first motor generator MG1 for differential action, a differential mechanism 24 and a second motor generator MG2 for propelling a vehicle. The differential mechanism 24 mechanically distributes the output power of the engine 14 between the first motor generator MG1 and the transmission member 18. The second motor generator MG2 is operatively coupled to the transmission member 18 so as to rotate integrally with the transmission member 18. Each of the first motor generator MG1 and the second motor generator MG2 is allowed to be alternatively used as an electric motor or a generator. The first motor generator MG1 corresponds to a first rotary machine. The second motor generator MG2 corresponds to a second rotary machine.

The differential mechanism 24 is configured as a single pinion planetary gear train, and includes a sun gear S0, a carrier CA0 and a ring gear R0. The carrier CA0 is a first rotating element that is coupled to the engine 14 via a coupling shaft 36. The sun gear S0 is a second rotating element that is coupled to the first motor generator MG1. The ring gear R0 is a third rotating element that is coupled to the transmission member 18. In other words, in a nomograph for the electrical differential unit 16, shown at the left side of FIG. 3, the engine 14 is coupled to the carrier CA0 that is located in the middle and of which the rotation speed is intermediate, and the first motor generator MG1 for differential action and the second motor generator MG2 for propelling a vehicle are respectively coupled to the sun gear S0 and the ring gear R0 that are located at both ends. These sun gear S0, carrier CA0 and ring gear R0 are rotatable relative to one another. The output power of the engine 14 is distributed between the first motor generator MG1 and the transmission member 18. The second motor generator MG2 is driven to rotate or an electrical storage device (battery) 40 is charged via an inverter 38 with electric energy obtained by executing regenerative control (also referred to as power generation control) over the first motor generator MG1. By controlling the rotation speed (MG1 rotation speed) Ng of the first motor generator MG1, that is, the rotation speed of the sun gear S0, through regenerative control or power running control over the first motor generator MG1, it is possible to change the differential state of the differential mechanism 24 as needed, and a speed ratio γ0 (=Ne/Nm) of the rotation speed of the coupling shaft 36, that is, an engine rotation speed Ne, to the rotation speed (transmission member rotation speed) Nm of the transmission member 18 is continuously changed. That is, the electrical differential unit 16 functions as an electrical continuously variable transmission unit. The transmission member rotation speed Nm is equal to the rotation speed (MG2 rotation speed) of the second motor generator MG2, so both the transmission member rotation speed and the MG2 rotation speed are denoted by the same reference sign Nm.

The mechanical stepped transmission unit 20 constitutes part of a power transmission path between the engine 14 and the drive wheels 34. The mechanical stepped transmission unit 20 is a planetary gear multi-stage transmission including a single pinion first planetary gear train 26 and a single pinion second planetary gear train 28. The first planetary gear train 26 includes a sun gear S1, a carrier CA1 and a ring gear R1. The second planetary gear train 28 includes a sun gear S2, a carrier CA2 and a ring gear R2. The sun gear S1 is selectively coupled to the case 12 via a first brake B1. The sun gear S2 is selectively coupled to the transmission member 18 via a first clutch C1. The carrier CA1 and the ring gear R2 are integrally coupled to each other. The carrier CA1 and the ring gear R2 are selectively coupled to the transmission member 18 via a second clutch C2, and are selectively coupled to the case 12 via a second brake B2. These carrier CA1 and ring gear R2 are coupled to the case 12 via a one-way clutch F1. The case 12 is a non-rotating member. These carrier CA1 and ring gear R2 are permitted to rotate in the same direction as the engine 14, and are blocked from rotating in the opposite direction. The ring gear R1 and the carrier CA2 are integrally coupled to each other, and are integrally coupled to the output shaft 22.

Figure 2:
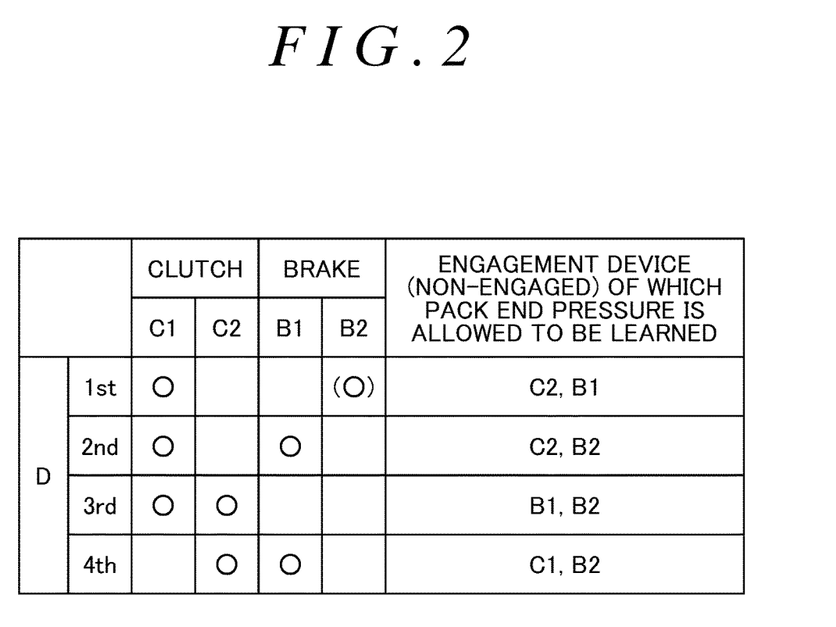
FIG. 2 is a view that illustrates the relationship between a plurality of gear positions of a mechanical stepped transmission unit provided in the vehicle driving system shown in FIG. 1 and hydraulic friction engagement devices that establish those gear positions.

The mechanical stepped transmission unit 20 establishes a plurality of forward gear positions having different speed ratios γ (=Nm/Nout) of the transmission member rotation speed Nm to the rotation speed (output rotation speed) Nout of the output shaft 22 by selectively engaging the clutches C1, C2 and the brakes B1, B2 (hereinafter, when not specifically distinguished from one another, simply referred to as clutches C and brakes B). As shown in the engagement operation chart of FIG. 2, a first-speed gear position "1st" having the largest speed ratio γ is established by engaging the first clutch C1 and the second brake B2, a second-speed gear position "2nd" having a smaller speed ratio γ than the first-speed gear position is established by engaging the first clutch C1 and the first brake B1, a third-speed gear position "3rd" having a speed ratio γ of 1 is established by engaging the first clutch C1 and the second clutch C2, and a fourth-speed gear position "4th" having a speed ratio γ smaller than 1 is established by engaging the second clutch C2 and the first brake B1. Because the one-way clutch F1 is provided in parallel with the second brake B2, the second brake B2 just needs to be engaged in the case where engine brake is caused to work when in a driven state, and the one-way clutch F1 may be placed in a released state when in a driving state, such as at the start of movement.

Figure 4:
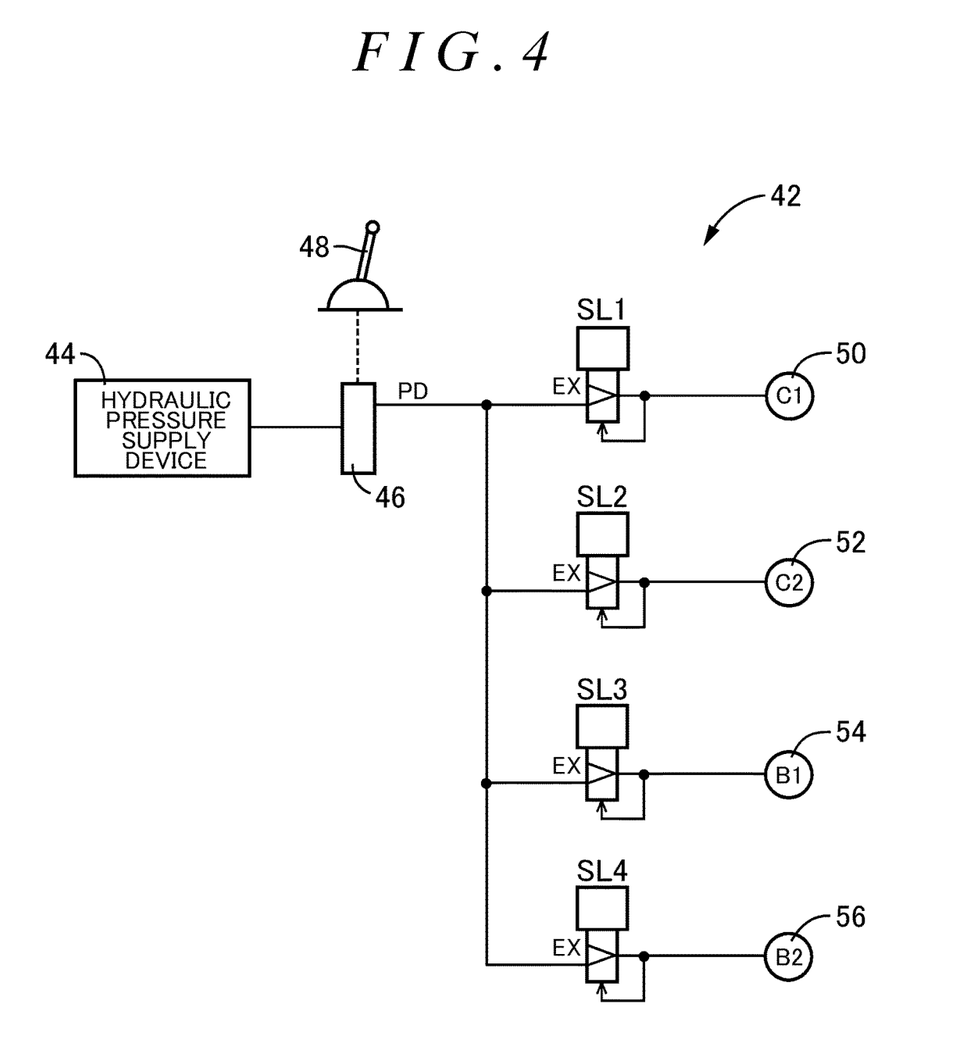
FIG. 4 is a circuit diagram that shows a hydraulic control circuit associated with clutches C1, C2 and brakes B1, B2 of the mechanical stepped transmission unit provided in the vehicle driving system shown in FIG. 1.

Each of the clutches C and the brakes B is a multi-disc or single-disc hydraulic friction engagement device that is frictionally engaged by hydraulic pressure. FIG. 4 is a circuit diagram that shows a relevant portion of a hydraulic control circuit 42 including linear solenoid valves SL1 to SL4 that control the engaged/released states of these clutches C and brakes B. A D range pressure (forward range pressure) PD is supplied from a hydraulic supply device 44 via a manual valve 46. The hydraulic supply device 44 includes a mechanical oil pump, an electric oil pump, or the like, as a hydraulic pressure source. The mechanical oil pump is driven by the engine 14 to rotate. The electric oil pump is driven by an electric motor when the engine is not in operation. The hydraulic supply device 44 regulates pressure by using a line pressure control valve, and the like, and then outputs a predetermined hydraulic pressure (line pressure). The manual valve 46 is used to mechanically or electrically switch an oil passage in response to operation of a shift lever 48 with which a D range for forward traveling, an R range for reverse traveling, an N range for interrupting transmission of power, or the like, is allowed to be selected. When the D range is selected, the D range pressure PD is output.

The linear solenoid valves SL1 to SL4 that are hydraulic control devices are respectively arranged in correspondence with hydraulic actuators (hydraulic cylinders) 50, 52, 54, 56 of the clutches C1, C2 and brakes B1, B2. Each of the linear solenoid valves SL1 to SL4 is independently excited or de-excited by an electronic control unit 60, the hydraulic pressure of each of the hydraulic actuators 50, 52, 54, 56 is independently regulated, and the engaged/released state of each of the clutches C1, C2 and brakes B1, B2 is individually controlled. Thus, the forward gear positions 1st to 4th are established. In shift control over the mechanical stepped transmission unit 20, a so-called clutch-to-clutch shift is performed. In the clutch-to-clutch shift, for example, the engaged/released states of any two of the clutches C and brakes B, associated with a shift, are controlled at the same time. For example, in a 3rd-to-2nd downshift from the third-speed gear position "3rd" to the second-speed gear position "2nd", the second clutch C2 is released and the first brake B1 is engaged as shown in the engagement operation chart of FIG. 2; however, in order to prevent or reduce shift shock, a releasing transient hydraulic pressure of the second clutch C2 and an engaging transient hydraulic pressure of the first brake B1 are regulated in accordance with a predetermined change pattern, or the like. In this way, the hydraulic pressure, that is, engagement torque, of each of the plurality of engagement devices (clutches C and brakes B) of the mechanical stepped transmission unit 20 is allowed to be independently and continuously controlled by a corresponding one of the linear solenoid valves SL1 to SL4.

In the thus configured vehicle driving system 10, in a state where the mechanical stepped transmission unit 20 is held in any one of the gear positions a speed ratio $\gamma 0$ of the electrical differential unit 16 is steplessly varied. Thus, a stepless shift is allowed to be performed with a predetermined range of speed ratio in each gear position G A total speed ratio $\gamma T$ (=Engine rotation speed Ne/Output rotation speed Nout) of the vehicle driving system 10 is a value obtained by multiplying the speed ratio $\gamma 0$ of the electrical differential unit 16 by the speed ratio $\gamma$ of the mechanical stepped transmission unit 20, and is steplessly varied. When the rotation speed Ng of the first motor generator MG1 is controlled such that the speed ratio $\gamma 0$ of the electrical differential unit 16 is kept constant (for example, $\gamma 0=1$) irrespective of a shift of the mechanical stepped transmission unit 20, the total speed ratio $\gamma T$ is varied in a stepwise manner with a shift of the mechanical stepped transmission unit 20, with the result that a shift feeling similar to a stepped transmission is obtained as a whole.

Figure 3:
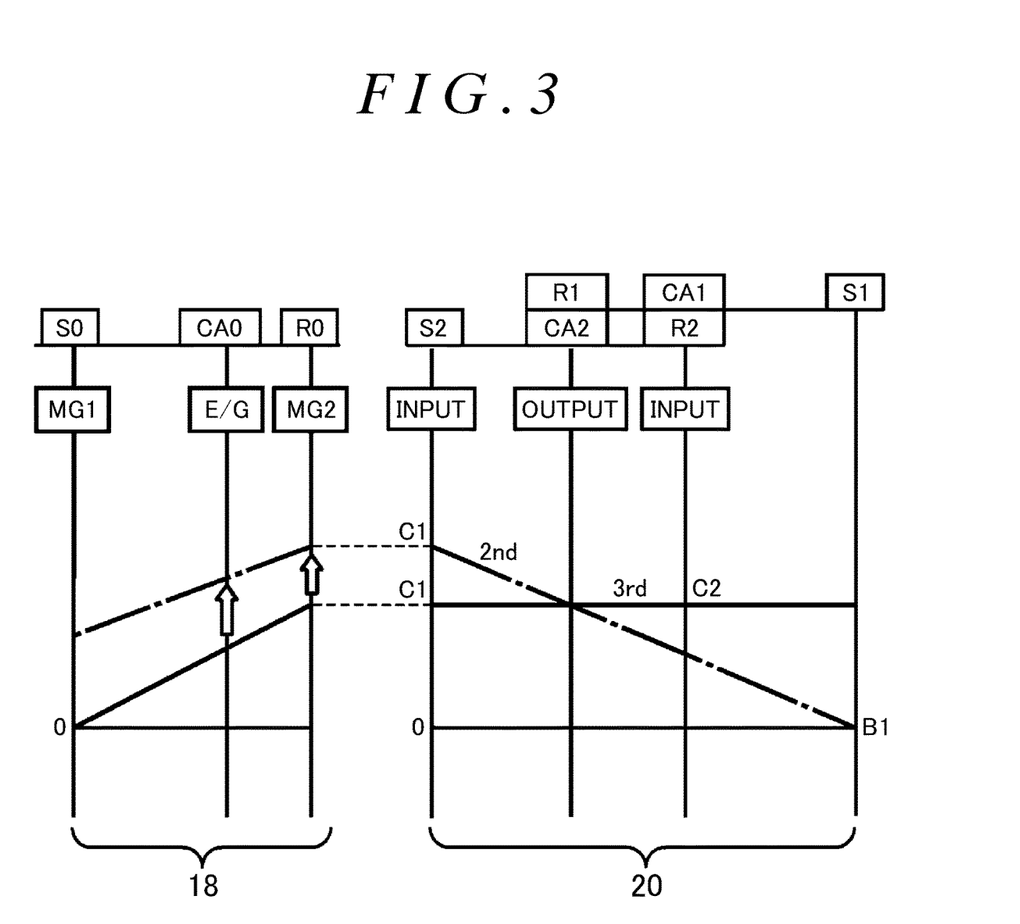
FIG. 3 is a nomograph for an electrical differential unit and the mechanical stepped transmission unit that are provided in the vehicle driving system shown in FIG. 1, and is a view that illustrates a second-speed gear position "2nd" and a third-speed gear position "3rd"

FIG. 3 is a nomograph that shows the relative relationship, represented by lines, among the rotation speeds of the rotating elements of which a coupled state varies in each gear position in association with the electrical differential unit 16 and the mechanical stepped transmission unit 20. The interval between any adjacent vertical lines of the nomograph of FIG. 3, that is, the interval between any adjacent two of the three vertical lines shown for the electrical differential unit 16, is determined in response to the gear ratio $\rho$ of the single pinion planetary gear train that constitutes the differential mechanism 24, and the interval between any adjacent two of the four vertical lines shown for the mechanical stepped transmission unit 20 is determined in response to the gear ratio $\rho 1$ of the first planetary gear train 26 and the gear ratio $\rho 2$ of the second planetary gear train 28. In FIG. 3, the wide continuous line represents the case where the gear position G of the mechanical stepped transmission unit 20 is the third-speed gear position "3rd", the wide alternate long and short dashed line represents the case where the gear position G of the mechanical stepped transmission unit 20 is the second-speed gear position "2nd", and, at the time of a power-on 3rd-to-2nd downshift in which an accelerator pedal is depressed, the rotation speed of each of the rotating elements of the electrical differential unit 16 is also changed. Specifically, as indicated by the open arrows in FIG. 3, not only the rotation speed Nm of the transmission member 18 that is the input member of the mechanical stepped transmission unit 20, that is, the rotation speed Nm of the ring gear R0, is increased in response to a change in the speed ratio $\gamma$ of the mechanical stepped transmission unit 20 but also the engine rotation speed Ne is also increased.

The vehicle driving system 10 includes the electronic control unit 60 as a controller. The electronic control unit 60 executes output control over the engine 14, and executes shift control over the electrical differential unit 16 and the mechanical stepped transmission unit 20. The electronic control unit 60 includes a so-called microcomputer. The microcomputer includes, for example, a CPU, a ROM, a RAM, input/output interfaces, and the like. The CPU executes signal processing in accordance with programs prestored in the ROM while utilizing a temporary storage function of the RAM. The electronic control unit 60 is, where necessary, split into an electronic control unit for engine control, an electronic control unit for shift control, and the like. Various pieces of information required for control are supplied to the electronic control unit 60 from, for example, an accelerator operation amount sensor 62, a vehicle speed sensor 64, an engine rotation speed sensor 66, an MG1 rotation speed sensor 68 and an MG2 rotation speed sensor 70. The various pieces of information include an accelerator operation amount Acc, a vehicle speed V, the engine rotation speed Ne, the MG1 rotation speed Ng and the MG2 rotation speed Nm. The vehicle speed V corresponds to the output rotation speed Nout.

The electronic control unit 60 functionally includes a step shift control unit 72 and a hybrid control unit 76. The step shift control unit 72, for example, determines whether to cause the mechanical stepped transmission unit 20 to shift in accordance with a predetermined shift map, or the like, using the vehicle speed V and a required output power amount, such as the accelerator operation amount Acc, as parameters. Where necessary, the step shift control unit 72 automatically changes the gear position G of the mechanical stepped transmission unit 20 by changing the engaged/ released states (engaged state) of the clutches C and brakes B with the use of the linear solenoid valves SL1 to SL4. The step shift control unit 72 further functionally includes a coordinated shift control unit 74. The coordinated shift control unit 74 controls the engine 14, the first motor generator MG1 and the second motor generator MG2 via the hybrid control unit 76 when the mechanical stepped transmission unit 20 is caused to shift. For example, at the time of a power-on downshift, such as the 3rd-to-2nd downshift shown in FIG. 3, the (power running and regenerative) torque of the second motor generator MG2 is controlled in a feedback manner such that the rotation speed Nm of the transmission member 18 becomes a target transmission member rotation speed Nmt after shifting, which is determined in the shift, and the (power running and regenerative) torque of the first motor generator MG1 is controlled in a feedback manner such that the engine rotation speed Ne becomes a predetermined target engine rotation speed Net. That is, the mechanical stepped transmission unit 20 is basically caused to shift through engaging and releasing control over the hydraulic friction engagement devices (clutches C and brakes B). However, sufficient control accuracy is not obtained by only hydraulic control. Therefore, it is desirable to control the rotation speed Nm of the transmission member 18 that is the input member with the use of the second motor generator MG2 with high accuracy so as to match the progress of a shift of the electrical differential unit 16.

The hybrid control unit 76, for example, causes the engine 14 to operate in a fuel-efficient operation range, and steplessly varies the speed ratio γ0 of the electrical differential unit 16 by controlling the assignment of driving force between the engine 14 and the second motor generator MG2 and reaction force caused by generation of electric power by the first motor generator MG1. For example, a target (required) output power of the vehicle is calculated on the basis of the accelerator operation amount Acc, which is a required output power amount of a driver, and the vehicle speed V at the moving vehicle speed V at that time, a required total target output power is calculated on the basis of the target output power of the vehicle and a required charging value, a required input torque Tin of the mechanical stepped transmission unit 20 is obtained in response to the speed ratio γ, or the like, in the gear position G of the mechanical stepped transmission unit 20 such that the total target output power is obtained. In addition, further in consideration of assist torque, or the like, of the second motor generator MG2, a target engine output power (required engine output power) is calculated such that the required input torque Tin is obtained. The engine 14 is controlled and the amount of electric power (regenerative torque) generated by the first motor generator MG1 is controlled in a feedback manner such that the engine rotation speed Ne and engine torque Te that provide the target engine output power are obtained. For example, in automatic cruise control, or the like, that keeps the vehicle speed V constant, the required input torque Tin is controlled in a feedback manner and the torque of each of the engine 14, the first motor generator MG1 and the second motor generator MG2 is controlled such that the transmission member rotation speed Nm is kept at a predetermined rotation speed. Output control over the engine 14 is, for example, executed via an engine control device 58 including an electronic throttle valve, a fuel injection device, an ignition device, and the like. The electronic throttle valve controls an intake air amount. The fuel injection device controls a fuel injection amount. The ignition device is able to execute advance/retardation control over ignition timing.

Power running control and regenerative control over each of the first motor generator MG1 and the second motor generator MG2 are executed while charging and discharging control over the electrical storage device 40 via an inverter 38 is being executed.

The electronic control unit 60 further functionally includes a pack end pressure learning unit 80. The pack end pressure learning unit 80 leans a pack end pressure just before each of the plurality of hydraulic friction engagement devices (clutches C and brakes B) of the mechanical stepped transmission unit 20 begins to have an engagement torque. That is, each of the hydraulic actuators 50, 52, 54, 56 includes a return spring. Each of the hydraulic actuators 50, 52, 54, 56 generates engagement torque when friction materials are frictionally engaged with each other as a result of movement of a piston against the urging force of the return spring. The hydraulic pressure just before each of the hydraulic actuators 50, 52, 54, 56 begins to have an engagement torque is a pack end pressure. For example, when the hydraulic friction engagement devices (clutches C and brakes B) are released through neutral control, it is possible to quickly engage the hydraulic friction engagement devices to generate driving force at the time of cancelling neutral control by keeping the hydraulic pressure of each of the hydraulic friction engagement devices at the corresponding pack end pressure. On the other hand, the pack end pressure varies or changes depending on variations or aging in friction coefficient among the friction materials, individual differences, such as a dimensional error of a pressure receiving portion, variations or aging in spring force among the return springs, and the like, so the pack end pressure is learned at predetermined timing by the pack end pressure learning unit 80.

The pack end pressure learning unit 80 functionally includes an input torque estimation unit 82 and a hydraulic control unit 84. The pack end pressure learning unit 80 executes signal processing in accordance with step S1 to step S8 (hereinafter, simply referred to as S1 to S8) of the flowchart shown in FIG. 5. S4 to S6 in FIG. 5 correspond to the hydraulic control unit 84. The input torque estimation unit 82 calculates an estimated input torque Tc on the basis of the equation of motion of the electrical differential unit 16 by executing signal processing in accordance with step R1 to step R4 (hereinafter, simply referred to as R1 to R4) of the flowchart shown in FIG. 6. The estimated input torque Tc is an estimated value of input torque that is input from the electrical differential unit 16 to the mechanical stepped transmission unit 20.

Figure 5:
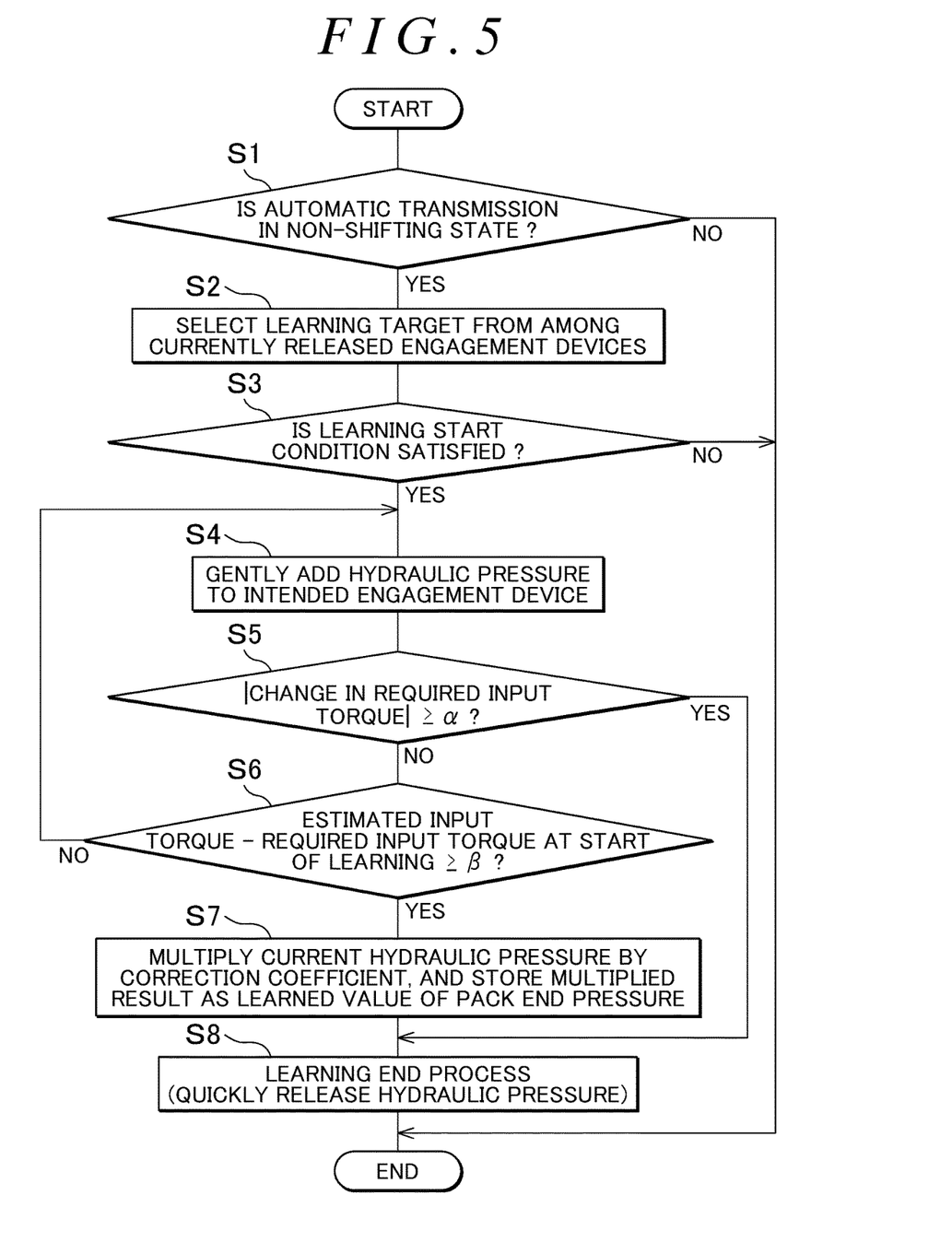
FIG. 5 is a flowchart that specifically illustrates operations of a pack end pressure learning unit shown in FIG. 1.
Figure 6:
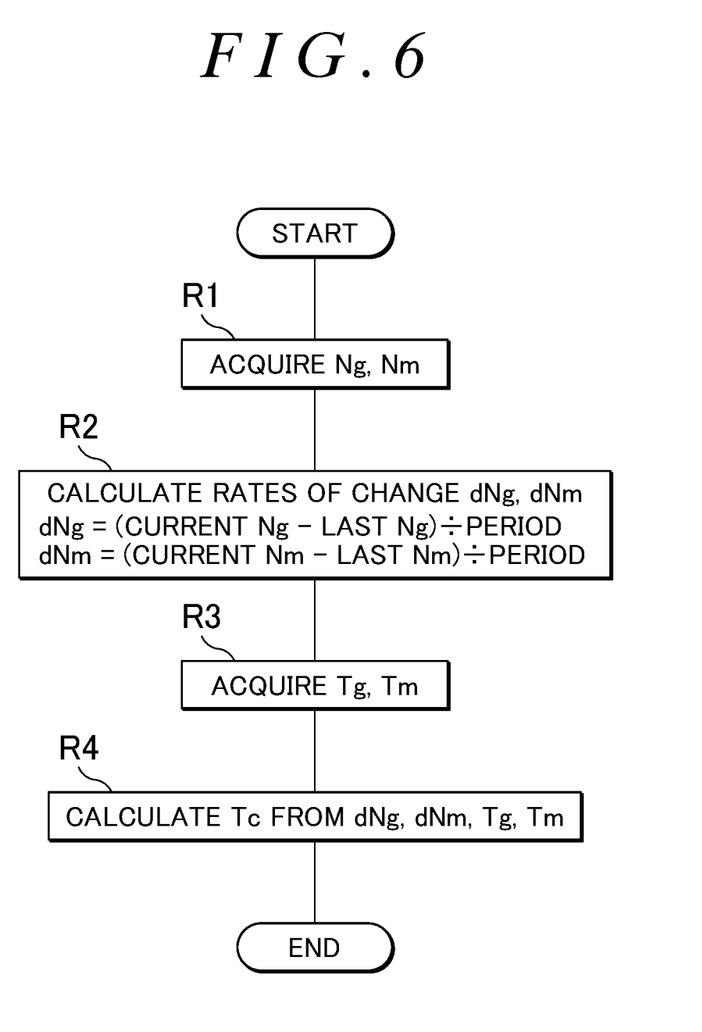
FIG. 6 is a flowchart that specifically illustrates operations of an input torque estimation unit shown in FIG. 1.

In S1 of FIG. 5, it is determined whether the mechanical stepped transmission unit 20 is in a non-shifting state, that is, whether the vehicle is traveling in D range in which any one of the gear positions G is established. The process directly ends when the mechanical stepped transmission unit 20 is shifting; whereas, when the mechanical stepped transmission unit 20 is not shifting, S2 is executed, and a learning target is selected from among the currently released hydraulic friction engagement devices. This learning target is any one of non-engaged friction engagement devices shown in the right-end column of the engagement operation chart shown in FIG. 2. While the vehicle is traveling in the first-speed gear position "1st", any one of the second clutch C2 and the first brake B1 is selected. When the vehicle is traveling in the second-speed gear position "2nd", any one of the second clutch C2 and the second brake B2 is selected. When the vehicle is traveling in the third-speed gear position "3rd", any one of the first brake B1 and the second brake B2 is selected. When the vehicle is traveling in the fourth-speed gear position "4th", any one of the first clutch C1 and the second brake B2 is selected. There are two candidates in any gear position, and may be, for example, selected so as to be alternately learned.

Figure 7:
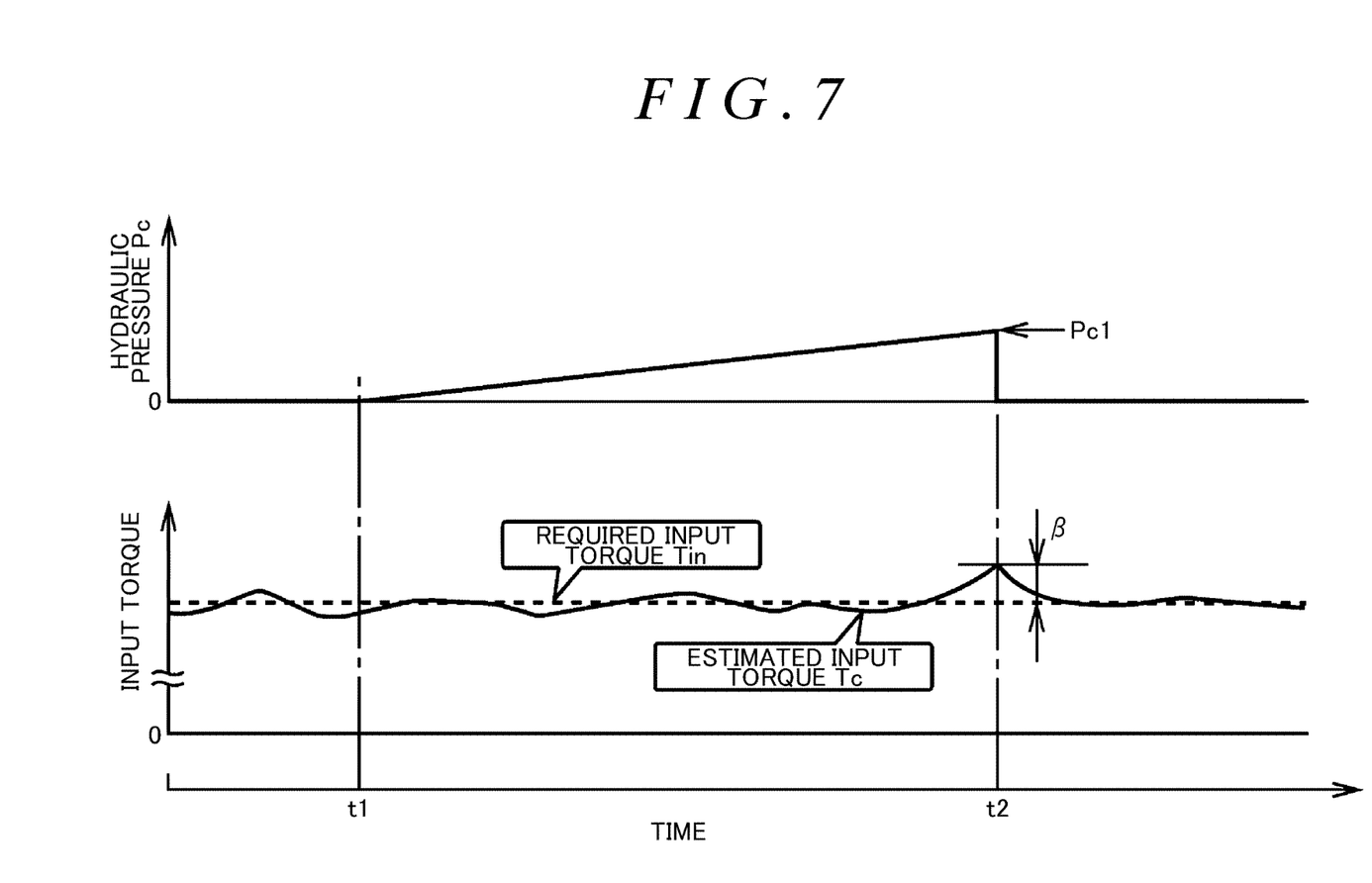
FIG. 7 is an example of a timing chart that shows changes in hydraulic pressure and changes in input torque in the case where control for learning a pack end pressure is executed in accordance with the flowchart of FIG. 5.

In the next S3, it is determined whether a predetermined learning start condition is satisfied. When the predetermined learning start condition is not satisfied, the process directly ends; whereas, when the predetermined learning start condition is satisfied, hydraulic pressure learning process from S4 is executed. The learning start condition is, for example, a steady traveling condition in which a throttle valve opening degree corresponding to the intake air amount, the vehicle speed V, and the like, are substantially constant, a condition that the number of shift operations from the last execution of learning, a traveling distance, or the like, exceeds a set value determined in advance, or the like. In S4, a hydraulic pressure Pc is gently applied to the intended hydraulic friction engagement device. FIG. 7 is an example of a timing chart that shows changes in hydraulic pressure Pc of the intended hydraulic friction engagement device, estimated input torque Tc (continuous line) and required input torque Tin (dashed line) in the case where hydraulic pressure learning process from S4 is executed. Time t1 is time at which affirmative determination is made in S3 and the hydraulic pressure learning process is started. The hydraulic pressure Pc is gently increased at a constant rate of change. The hydraulic pressure Pc in FIG. 7 is a hydraulic pressure command value; however, a change is relatively small, so it may be regarded that the hydraulic pressure Pc is substantially the same as an actual hydraulic pressure (actual hydraulic pressure). However, it is possible to detect an actual hydraulic pressure with the use of a hydraulic pressure sensor, or the like. On the basis of a learned value of the pack end pressure at a current point in time, the hydraulic pressure may be increased to the pack end pressure or a hydraulic pressure value slightly lower than the pack end pressure at a stroke, and then may be gently increased at a constant rate of change.

In S5, it is determined whether the absolute value of a change in required input torque Tin is larger than or equal to a predetermined determination value α. When the absolute value of a change in required input torque Tin is larger than or equal to the determination value α, there is a possibility of erroneous learning due to a large change in driving force, so the process immediately proceeds to S8, quickly releases the hydraulic pressure Pc, and ends the hydraulic pressure learning process. The required input torque Tin is a required input torque of the mechanical stepped transmission unit 20, calculated in response to the speed ratio γ of the gear position G of the mechanical stepped transmission unit 20, or the like, such that a total target output power that is obtained on the basis of the accelerator operation amount Acc, the vehicle speed V, and the like, is obtained. The required input torque Tin is a value calculated by the hybrid control unit 76 in controlling the engine 14, the first motor generator MG1 and the second motor generator MG2. A large change in the required input torque Tin means a large change in driving force. For example, a difference ΔTin between the required input torque Tin1 and a current value Tin at the start of hydraulic pressure learning process (time t1 in FIG. 7) is calculated as the amount of change, and it is determined whether the absolute value of the amount of change is larger than or equal to the determination value α. A constant value is, for example, determined in advance as the determination value α. The process of S5 may be omitted, and S6 may be constantly executed subsequent to S4.

When negative determination is made in S5, S6 is subsequently executed. In S6, it is determined whether a difference (Tc−Tin1) between the estimated input torque Tc and the required input torque Tin1 at the start of learning is larger than or equal to a predetermined determination value β. The estimated input torque Tc is calculated in accordance with the flowchart of FIG. 6 by the input torque estimation unit 82. In R1, the MG1 rotation speed Ng and the MG2 rotation speed Nm are acquired. In R2, rotational rates of change (differential values) dNg, dNm are calculated on the basis of the amount of change in MG1 rotation speed Ng (a difference between the current value and the last value), the amount of change in MG2 rotation speed Nm (a difference between the current value and the last value) and a sampling period. In R3, the torque (MG1 torque) Tg of the first motor generator MG1 and the torque (MG2 torque) Tm of the second motor generator MG2 are acquired. For example, torque command values (current values, or the like) for the first motor generator MG1 and the second motor generator MG2 are read as MG1 torque Tg and MG2 torque Tm. In R4, the estimated input torque Tc is calculated in accordance with the predetermined following mathematical expression (1) by using those MG1 rotational rate of change dNg, MG2 rotational rate of change dNm, MG1 torque Tg and MG2 torque Tm as parameters. Designed values are used for MG1 inertia Ig, MG2 inertia Im and the gear ratio ρ of the differential mechanism 24. This mathematical expression (1) is determined on the basis of the equations of motion for the electrical differential unit 16, shown in the following mathematical expressions (2) to (5), and specifically the mathematical expression (1) is obtained by replacing the term of Tx in the mathematical expression (4) with the mathematical expression (3).

$$Tc = Tm - ImdNm - \frac{1}{\rho}Tg + \frac{1}{\rho}IgdNg \qquad (1)$$

$$IedNe = Te - Tx \qquad (2)$$

$$IgdNg = Tg + \frac{\rho}{1+\rho}Tx \qquad (3)$$

$$ImdNm = Tm - Tc + \frac{1}{1+\rho}Tx \qquad (4)$$

$$dNe = \frac{\rho}{1+\rho}dNg + \frac{1}{1+\rho}dNm \qquad (5)$$

Where Ig denotes MG1 inertia, Im denotes MG2 inertia, Ie denotes engine inertia, Tg denotes MG1 torque, Tm denotes MG2 torque, Te denotes engine torque, Tx denotes distribution torque, dNg denotes MG1 rotational rate of change, dNm denotes MG2 rotational rate of change, dNe denotes engine rotational rate of change, ρ denotes the gear ratio of the differential mechanism, and Tc denotes estimated input torque.

When negative determination is made in S6 of FIG. 5, that is, when the difference (Tc−Tin1) between the estimated input torque Tc and the required input torque Tin1 at the start of learning is smaller than the determination value β, the intended hydraulic friction engagement device has not had an engagement torque yet, so the hydraulic pressure Pc is gradually increased by repeating the process from S4. On the other hand, when the difference (Tc−Tin1) becomes larger than or equal to the determination value β, it is regarded that the intended hydraulic friction engagement device has begun to have an engagement torque, so the process from S7 is executed, and the pack end pressure is learned on the basis of the hydraulic pressure Pc1 at that time. That is, as the intended hydraulic friction engagement device begins to have an engagement torque, the engagement torque becomes rotational resistance for the mechanical stepped transmission unit 20, and decreases the transmission member rotation speed Nm, which is the input rotation speed of the mechanical stepped transmission unit 20, and the engine rotation speed Ne, with the result that the estimated input torque Tc that is obtained from the mathematical expression (1) using the rotation speed differential values (rates of change) of the transmission member rotation speed Nm and engine rotation speed Ne increases. The hydraulic pressure Pc1 is a hydraulic pressure to such an extent that the non-engaged hydraulic friction engagement device begins to have an engagement torque, so the hydraulic pressure Pc1 does not influence traveling. Time t2 in FIG. 7 is time at which the difference (Tc−Tin1) becomes larger than or equal to the determination value and affirmative determination is made in S6. For example, a constant value is determined in advance for each of the plurality of hydraulic friction engagement devices as the determination value β. Instead, a common constant value may be determined for all the hydraulic friction engagement devices. It may be determined whether the hydraulic friction engagement device has begun to have an engagement torque on the basis of whether not the difference between the estimated input torque Tc and the required input torque Tin1 at the start of learning but the difference (Tc−Tin) between the estimated input torque Tc and the current required input torque Tin is larger than or equal to the determination value β. When hydraulic pressure learning process is executed while the vehicle is traveling in a steady state where the intake air amount, such as the throttle valve opening degree, and the vehicle speed V are substantially constant, it may be determined whether the hydraulic friction engagement device begun to have an engagement torque on the basis of whether the amount of change in estimated input torque Tc, for example, the amount of change in current value Tc with respect to the estimated input torque Tc1 at the start of learning, is larger than or equal to the determination value β.

In learning in S7, the hydraulic pressure Pc1 at the time when affirmative determination is made in S6 or a hydraulic pressure value slightly lower than the hydraulic pressure Pc1 may be learned (updated and stored) as the pack end pressure. However, in the present embodiment, in order to prevent hunting, a new pack end pressure (learned value) is obtained by adding a value, obtained by multiplying a difference from the last pack end pressure (learned value) by a correction coefficient (for example, 0.6, or the like), to the last pack end pressure, and is stored. After that, S8 is executed, and the hydraulic pressure Pc is quickly released, after which a series of hydraulic pressure learning process ends.

In this way, with the vehicle driving system 10 according to the present embodiment, while the vehicle is traveling in a state where any one of the gear positions of the mechanical stepped transmission unit 20 is established, until the estimated input torque Tc that is obtained from the equation of motion for the electrical differential unit 16 changes, the hydraulic pressure Pc of the non-engaged intended hydraulic friction engagement device is increased, and the pack end pressure is learned on the basis of the hydraulic pressure Pc1 at that time. Therefore, irrespective of feedback control, or the like, over the motor generators MG1, MG2 of the electrical differential unit 16, it is possible to appropriately learn the pack end pressure. Thus, irrespective of individual differences of the portions, aging of the friction materials, or the like, it is possible to appropriately execute hydraulic control over the hydraulic friction engagement devices (clutches C and brakes B), that is, engaging and releasing control, or the like, at the time of shifting.

Because the estimated input torque Tc is calculated in accordance with the arithmetic expression (1) determined by using the MG1 torque Tg, the MG1 rotational rate of change dNg, the MG1 inertia Ig, the MG2 torque Tm, the MG2 rotational rate of change dNm, the MG2 inertia Im and the gear ratio ρ of the differential mechanism 24, it is possible to obtain the estimated input torque Tc with high accuracy as compared to the case where the engine torque Te having low accuracy is used, so it is possible to learn the pack end pressure with high accuracy.

The embodiment of the invention is described in detail with reference to the accompanying drawing; however, the embodiment is illustrative. The invention may be implemented in modes including various modifications or improvements on the basis of the knowledge of persons skilled in the art.

What is claimed is:

1. A control apparatus for a vehicle driving system, the control apparatus comprising:
    an electrical differential unit including a planetary gear differential mechanism coupled to at least two rotary machines and an engine;
    a mechanical stepped transmission unit that is arranged between the electrical differential unit and a drive wheel and that establishes a plurality of gear positions having different speed ratios in response to engaged state of a plurality of hydraulic friction engagement devices;
    an input torque estimation unit that calculates an estimated input torque of the mechanical stepped transmission unit on the basis of an equation of motion for the electrical differential unit; and
    a hydraulic control unit that, while a vehicle is traveling in a state where any one of the gear positions of the mechanical stepped transmission unit is established, increases a hydraulic pressure of a non-engaged one of the hydraulic friction engagement devices of the mechanical stepped transmission unit until the estimated input torque changes by a predetermined amount or more.

2. The control apparatus according to claim 1, wherein a pack end pressure of the non-engaged one of the hydraulic friction engagement devices is learned on the basis of the hydraulic pressure at the time when the estimated input torque has changed by the predetermined amount or more.

3. The control apparatus according to claim 1, wherein the planetary gear differential mechanism is a single planetary gear train including a first rotating element coupled to the engine, a second rotating element coupled to a first rotary machine and a third rotating element coupled to a transmission member,
    a second rotary machine is coupled to the transmission member, and power is transmitted from the transmission member to the mechanical stepped transmission unit, and
    the estimated input torque is calculated in accordance with an arithmetic expression determined by using a torque of the first rotary machine, a rotational rate of change of the first rotary machine, an inertia of the first rotary machine, a torque of the second rotary machine, a rotational rate of change of the second rotary machine, an inertia of the second rotary machine and a gear ratio of the planetary gear train.

* * * * *